United States Patent [19]
Wada

[11] 3,792,433
[45] Feb. 12, 1974

[54] MASTER CYLINDER FOR HYDRAULIC BRAKING SYSTEM

[75] Inventor: Takeshi Wada, Toyota City, Japan

[73] Assignee: Aisin Seiki Kabushiki Kaisha, Tokyo, Japan

[22] Filed: Apr. 17, 1972

[21] Appl. No.: 244,653

[30] Foreign Application Priority Data
May 1, 1971 Japan................................ 46/29010
May 15, 1971 Japan................................ 46/32661
May 19, 1971 Japan................................ 46/33776

[52] U.S. Cl............... 340/52 C, 188/1 A, 200/82 D, 340/59, 340/244 E
[51] Int. Cl........................... B60q 1/44, B60t 11/22
[58] Field of Search.. 340/52 C, 59, 60, 240, 244 E; 200/82 D, 83 J; 188/345, 1 A, 152, 345

[56] References Cited
UNITED STATES PATENTS
| | | | |
|---|---|---|---|
| 2,566,545 | 9/1951 | Alcoriza | 200/83 J |
| 2,824,187 | 11/1958 | Fanning | 340/244 E |
| 3,064,432 | 11/1962 | Shutt | 188/345 |
| 3,421,322 | 1/1969 | Reznicek | 340/52 C |
| 3,560,920 | 2/1971 | Wing et al | 340/52 C |

Primary Examiner—John W. Caldwell
Assistant Examiner—Joseph E. Nowicki
Attorney, Agent, or Firm—Pierce, Scheffler & Parker

[57] ABSTRACT

This invention relates to a master cylinder for hydraulic braking system including a cylinder body, a bore formed in the body, a fluid displacing piston slidably mounted within the bore and having primary and secondary cups, a poppet valve interposed between a reservoir and a chamber formed in the bore for closing communication between the reservoir and the chamber against the fluid pressure in the chamber and for opening the communication therebetween against the fluid pressure in the reservoir, the poppet valve and the secondary cup act with the primary cup to form an airtight chamber filled with oil, a first warning of device for warning the failure of the primary cup, a second warning device for warning that the level of the brake fluid in the reservoir is low, and a third warning device for warning when the pressure the brake fluid in the reservoir is below a certain pressure.

7 Claims, 3 Drawing Figures

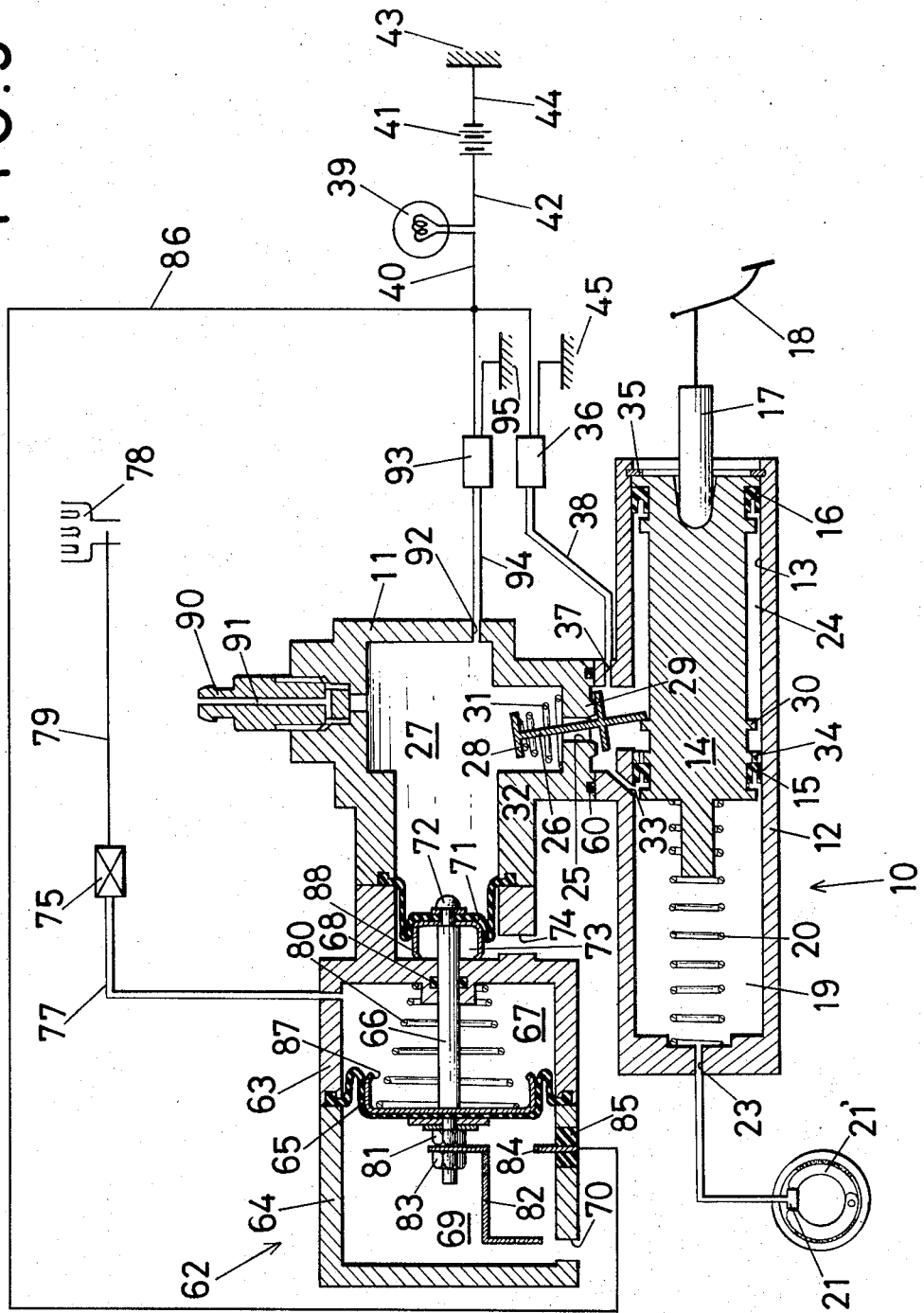

3,792,433

MASTER CYLINDER FOR HYDRAULIC BRAKING SYSTEM

BACKGROUND OF THE INVENTION

This invention relates to improvements in and relating to a master cylinder, especially adapted for use on automotive vehicles.

Generally speaking, a conventional master cylinder of the fluid displacing piston type is provided with a brake system so that a pressure responsive switch disposed in a fluid pressure circuit between the master cylinder and a brake wheel cylinder is switched on when the fluid pressure circuit is damaged, so that the driver of vehicle is warned of the abnormality of the fluid pressure circuit. However, in this master cylinder there is no provision of means for detecting damage to the sealing cup on the pressurized side by the piston and for warning the driver of vehicle, and further the fluid pressure to the brake wheel cylinder can't be increased by this system when this cup is damaged. These deficiencies are considered to be greatly disadvantageous in practice.

SUMMARY OF THE INVENTION

It is, therefore, an object of the present invention to provide an improved master cylinder for a hydraulic braking system adapted for obviating the aforementioned drawbacks of conventional master cylinders.

It is another object of the present invention to provide an improved cylinder for a hydraulic braking system capable of obtaining the same braking force as that normally obtained by the depression of a brake pedal even in the case of damage to the sealing cup and for sealing on the pressurized side by a piston and for sealing.

It is still another object of the present invention to provide an improved master cylinder for a hydraulic braking system capable of detecting damage to the sealing cup.

It is a further object of the present invention to provide an improved mster cylinder for a hydraulic braking system capable of detecting when the level of the brake fluid within reservoir tank becomes low.

It is still a further object of the present invention to provide an improved master cylinder for a hydraulic braking system capable of detecting when the fluid pressure within the reservoir is below a certain pressure.

BRIEF DESCRIPTION OF THE DRAWING

Various other objects, features and attendant advantages of this invention will be more fully appreciated as the same becomes better understood from the following detailed description when considered in connection with the accompanying drawings, in which:

FIG. 3 is a view similar to FIG. 2, showing an another modified form of mechanism.

DETAILED DESCRIPTION OF THE INVENTION

Figure 1:
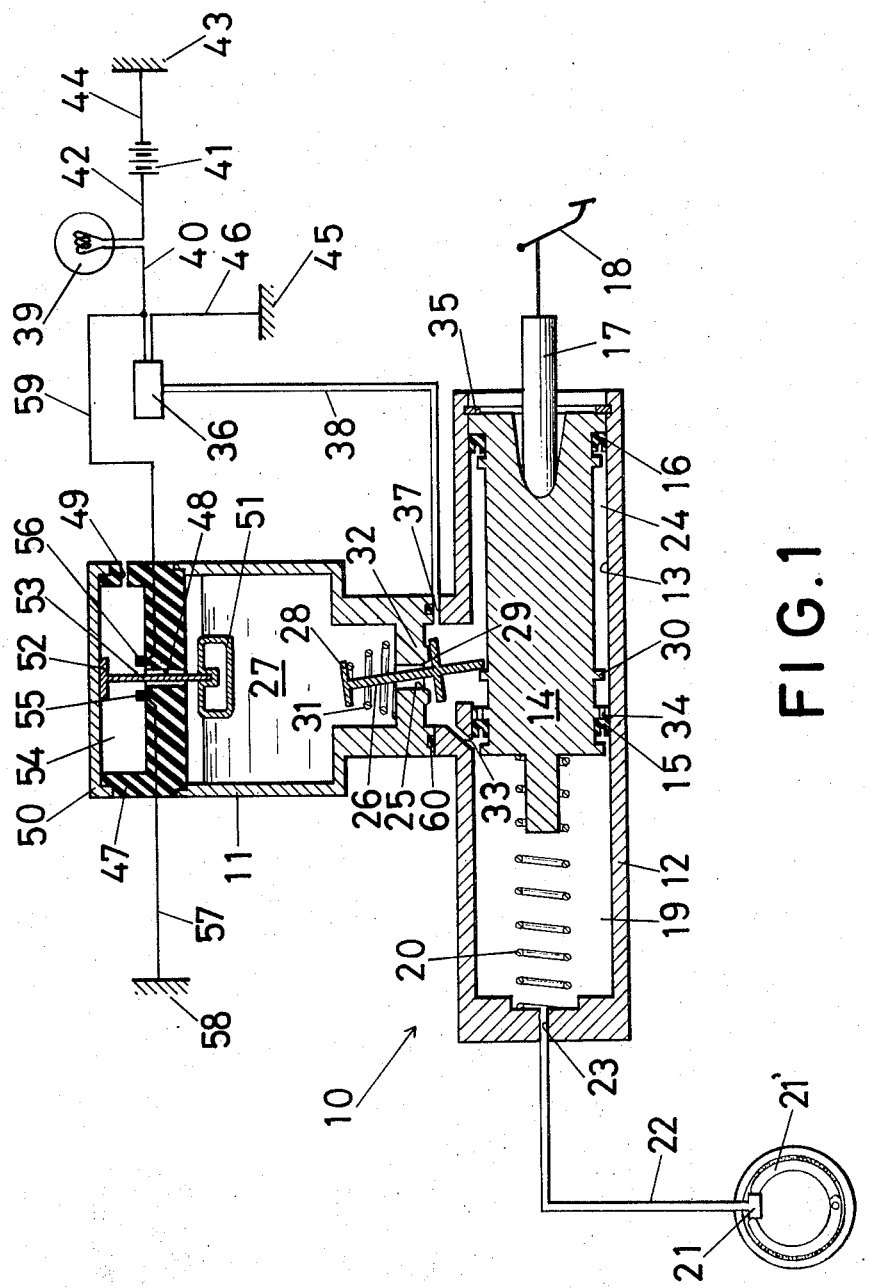
FIG. 1 is a sectional view taken axially through the master cylinder and associated elements with warning means and their components with the master cylinder diagrammatically illustrated.

Referring now to FIG. 1 of the accompanying drawings, the first embodiment of the invention will be described hereinbelow in detail.

In this FIG. 1, the numeral 10 denotes a master cylinder fixed to or substantially integral with an upper reservoir 11. The master cylinder 10 includes a cylinder body 12, a bore 13 formed in the body 12, and a fluid displacing piston 14 axially slidably mounted within the bore 13, and provided at both ends with primary and secondary annular sealing cups 15 and 16 respectively. The outer end of the piston 14 is axially recessed for receiving the end of a push rod 17 through which force is applied to the piston 14 by direct operation of a brake pedal 18. A chamber 19 is formed between the inner end wall of the piston 14 and an inside wall of the body 12. A return spring 20 interposed within the chamber 19 urges the piston 14 to the right as viewed in FIG. 1. The chamber 19 is always connected to brake wheel cylinders, of which only one is shown representatively at 21, through a conduit 22. The body 12 is provided with an outlet port 23 for communicating the fluid pressure within the chamber 19 to the brake wheel cylinder 21. An annular chamber 24, extending axially along a portion of the piston 14, communicates with the reservoir 11 via a port 25.

A poppet valve 26, being interposed between the annular chamber 24 and the chamber 27 of the reservoir 11 through the port 25 and having first and second protruding portions 28 and 29, is in contact with a projecting flange portion 30 formed on the outer peripheral surface of the piston 14. A spring 31 is disposed within the chamber 27 and one end of the spring 31 contacts the first protruding portion 28 of the poppet valve 26 and other end thereof contacts a bottom portion 32 of the reservoir 11. The poppet valve 26 is urged upwardly by the spring 31 and operates to close the communication between the annular chamber 24 and the chamber 27 by causing the protruding portion 29 to engage the annular valve seat of the bottom portion 32. The port 25 is opened by the poppet valve 26 when the depressing force of the brake pedal 18 is not applied and the port 25 is closed when the depressing force of the brake pedal 18 is applied, namely, the poppet valve 26 is so constructed that communication between the annular chamber 24 and the chamber 27 is closed when the piston 14 is moved to the left from the position shown in FIG. 1, namely, when the lower end of the poppet valve 26 and the projecting flange portion 30 of the piton 14 are disengaged.

A first compensating port 33 formed in the body 12 permits the brake fluid supplied from the reservoir 11 to pass to the chamber 19 and a second compensating port 34 formed on the left end of the piston 14 is capable of passing brake fluid within the annular chamber 24 from behind the primary cup 15 to the chamber 19. Upon releasing brake action the brake fluid within the annular chamber 24 passes into the chamber 19 from behind the contracted cup 15 through the second compensating port 34 while the first compensating port 33 is closed the piston 14 moving from the left position toward the right. The second compensating port 34 operates particularly efficiently when the pumping of the piston 14 is caused by double brake action and when the piston 14 is rapidly returned from the forward or left position. The fluid pressure within the annular chamber passes to the chamber 19 through the first compensating port 33 when the piston 14 is returned to the right position as viewed in FIG. 1. Numeral 35 is a snap ring positioned in an annular groove at the right-hand end of the bore 13 for regulating the rightward movement of the piston 14 as viewed in FIG. 1.

Numeral 36 is a pressure responsive switch fluidically connected to an outlet port 37 formed on the body 12 through a conduit 38, and a warning lamp 39 connected to the pressure responsive switch 36 through a wire 40 is lighted in responsive to the signal from the pressure responsive switch 36. A source of electricity 41 is connected to the warning lamp 39 through a wire 42 and is connected to ground 43 through a wire 44. Numeral 45 is the ground connected to the pressure responsive switch 36 through a wire 46. The pressure responsive switch 36 operates when the fluid pressure within the annular chamber 24 is increased, for example, by failure of the primary cup 15. An electric circuit, namely, the ground 45, the pressure responsive switch 36, the warning lamp 39, the source of electricity 41 and the ground 43 is made and the warning lamp 39 is lighted.

An insulator 47 placed on the upper end of the reservoir 11 has a port 48 at the center thereof and a port 49. A cap 50 is placed on the upper end of the insulator 47 and a float member 51 is disposed within the chamber 27 and is provided with a contact 52 of a float switch 53 made of metal to normally contact with the cap 50. The other end of switch 53 is connected to the float member 51 through the port 48. A chamber 54 formed by the insulator 47 and the cap 50 communicates with the atmosphere through the port 49. Contact points 55 and 56 formed on the upper surface of the insulator 47 are contacted by the contact 52 when the float member 51 is lowered by decrease of the brake fluid within the chamber 27. A wire 57 connected to the contact point 55 is connected to ground at 58 and a wire 59 connected to the contact point 56 is connected to the wire 40. An electric circuit, that is to say, ground 58, the contact point 55, the contact 52, the contact point 56, the warning lamp 39, the source of electricity 41 and ground 43 is made and the warning lamp 39 is lighted. Numeral 60 denotes an annular seal.

FIG. 1 illustrates the normal positions of the elements of the master cylinder 10 at a time when the vehicle brakes are not applied. The piston 14 is held in an extreme right-hand position against the snap ring 35. The left edge of the primary sealing cup 15 is positioned slightly to the right of the first compensating port 33. With the elements in the positions described fluid from the reservoir 11 fills the chambers 19 and 24.

The operation of the master cylinder 10 so far shown and described is as follows:

When the driver of the vehicle depresses the brake pedal 18, the piston 14 is moved against the biasing force of the spring 20 to the leftward direction through the rod 17 in FIG. 1. Responsive to this movement of the piston 14, the lower end of the poppet valve 26, in contact with the projecting flange portion 30 of the piston 14 becomes vertical by force of the spring 31 and the communication between the chambers 24 and 27 is closed when the protruding portions 29 engage the annular valve seat of the bottom portion 32. The fluid pressure within the chamber 19 is hermetically sealed by the operation of the primary cup 15 and is increased. This increased fluid pressure within the chamber 19 is delivered to the brake wheel cylinder 21 through the conduit 22 so that the brake is applied.

During this operation, the pressure responsive switch 36 does not operate and the warning lamp 39 is not lighted because the volume of the chamber 24 is not varied.

When the driver of the vehicle releases the brake pedal 18, the piston 14 is returned by the return spring 20 as seen in FIG. 1 and the fluid pressure within the chamber 24 communicates with the chamber 19 through the first compensating port 33.

Should a hydraulic failure occur in the primary sealing cup 15 during braking of the vehicle, the increased fluid pressure within the chamber 19 will communicate with the annular chamber 24 through the second compensating part 34 and then the chambers 19 and 24 will be hermetically sealed by the secondary sealing cup 16 so that the fluid pressure within the annular chamber 24 is increased so that the same normal fluid pressure is applied to the brake wheel cylinder 21, and the pressure through the conduit 38 is actuated to light the warning lamp 39 and warn the driver of the vehicle that a hydraulic failure has occurred in the primary sealing cup 15. During this time, the same fluid pressure is communicated to the wheel brake cylinder 21 through the conduit 22 as normally and the brake is applied.

Moreover, upon releasing the brakes the pressure in the chamber 19 is reduced when the piston 14 move backwardly from the forward position. Against the reduced pressure the fluid pressure within the annular chamber 24 is communicated to the chamber 19 through the second compensating port 34. The backward movement of the piston 14 continues until the poppet valve 26 opens and the brake fluid passes from the chamber 27 to the annular chamber 24 through the port 25.

When the quantity of fluid decreases within the chamber 27 of the reservoir 11, for example, by the excessive wear of brake shoe 21', the contact 52 of the float switch 53 contacts the contact points 55 and 56 to close the electric circuit from ground 58, 43 to ground and the warning lamp 39 is lighted so that the driver of the vehicle is warned that some abnormality has occurred.

Figure 2:
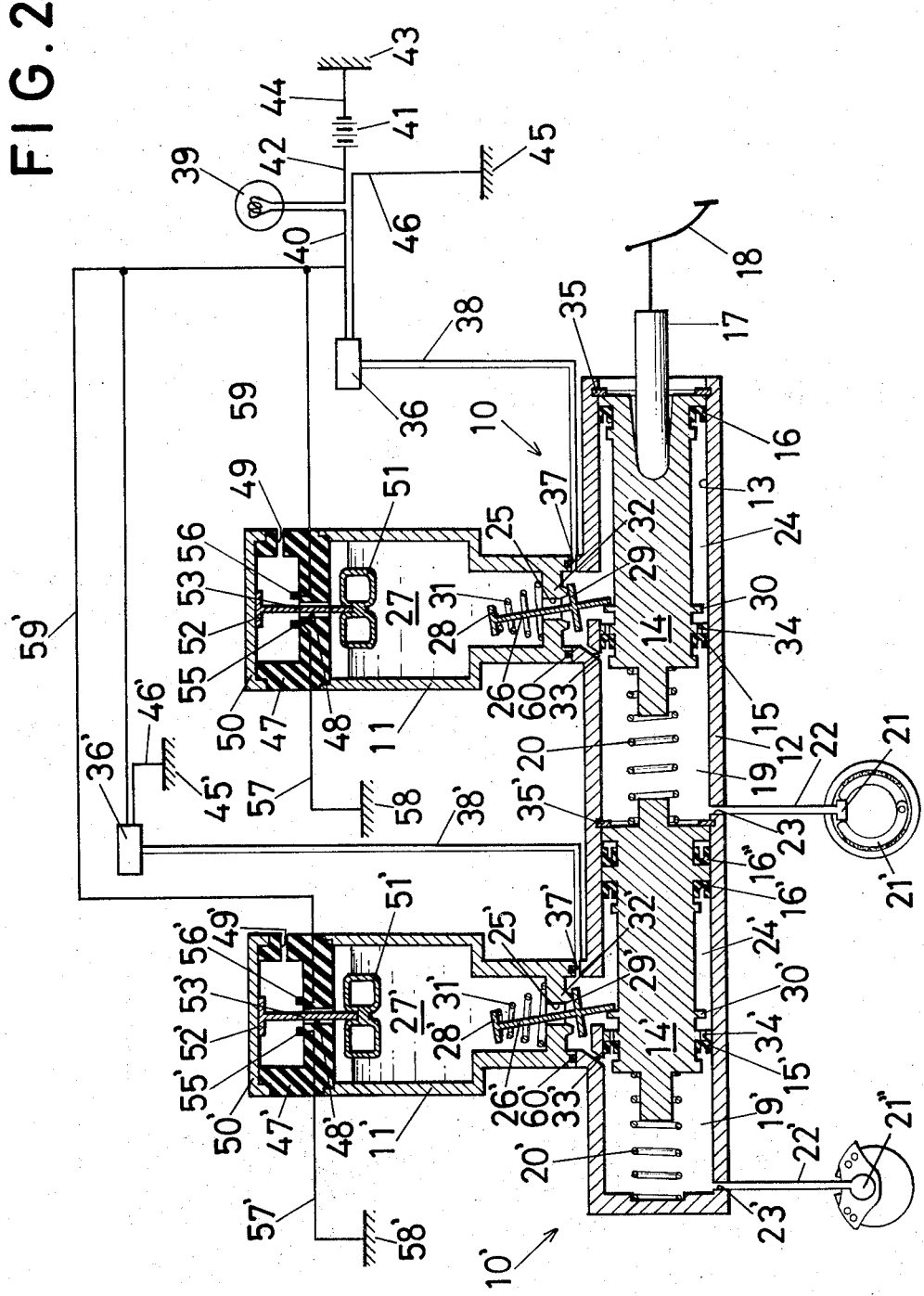
FIG. 2 is a view similar to FIG. 1, showing a modified form of mechanism, namely, a tandem master cylinder.

Next referring to FIG. 2, numeral 10' denotes a second master cylinder similar to master cylinder 10 as shown in FIG. 1, to form a tandem master cylinder. The construction and operation of the tandem master cylinder are the same as that shown in FIG. 1 except as follows:

A fluid displacing piston 14' axially slidably mounted within a common bore 13, is provided at its end with sealing cups 15', 16' and 16'' respectively. The right end of the piston 14' contacts with one end of the return spring 20 disposed within the chamber 19 and the left end thereof contacts with one end of a return spring 20' disposed within a chamber 19', and the other end of the return spring 20' contacts with the wall of the common body 12. The return spring 20' constantly urges the piston 14' in the rightward direction. The chamber 19' is always connected to front brake wheel cylinder, of which only one is shown representatively at 21'', through a conduit 22'. The body 12 is provided with an outlet port 23' for communicating the fluid pressure from the chamber 19' to the brake wheel cylinder 21''.

When the driver of the vehicle depresses the brake pedal 18, the piston 14 is moved against the biasing force of the spring 20 in the leftward direction through the rod 17 as viewed in FIG. 2. Responsive to this movement of the piston 14, the fluid pressure within the chamber 19 is increased and the increased fluid pressure is delivered to the rear brake wheel cylinder 21 through the conduit 22, while the piston 14' is moved against the return spring 20' by the biasing force of the return spring 20 and the increased fluid pressure within the chamber 19 to the leftward direction. By this movement of the piston 14', the fluid pressure within the chamber 19' is increased and the increased fluid pressure is delivered to the front brake wheel cylinder 21" so that front brakes are applied.

Referring now to FIG. 3, numeral 62 denotes a pressure device mounted on the left side of the reservoir 11. FIG. 3 is different from FIG. 1 only in respect that FIG. 3 has no float switch, and the construction and operation of this system are same as that in FIG. 1 and these are omitted except follows:

A first cylinder 63 of the pressure device 62 is connected to the left side of the reservoir 11 and a second cylinder 64 is connected to the left end of the first cylinder 63. The periphery of a diaphragm piston 65 is fixed between the first and second cylinder 63, 64, and one end of a piston rod 66 protrudes into the chamber 27 of the reservoir 11. A vacuum chamber 67, formed by the diaphragm piston 65 and a wall of the first cylinder 63, is made airtight by a seal 68 formed in the wall of the first cylinder 63. A chamber 69 formed by the diaphragm piston 65 and the left end wall of the second cylinder 64 and always communicates to the atmosphere through a port 70. A diaphragm 71 is supported on the right end of the piston rod 66 by means of a nut 72, and a chamber 73 is formed by the diaphragm 71 and the wall of the first cylinder 63 and communicates to the atmosphere through a port 74.

The vacuum chamber 67 is connected to a regulator valve 75 through a conduit 77. The regulator valve 75 is connected to an intake-manifold 78 of an engine, not shown, through a conduit 79. The rightwardly air pressure acting on the diaphragm piston 65 moves the piston rod 66 to the rightward direction against the biasing force of a spring 80 of which one end contacts the end wall of the first cylinder 63 and the other end contacts the diaphragm piston 65. The chamber 27 is kept at a certain pressure during the engine driving. The diaphragm piston 65, mounted on the left end of the piston rod 66, is supported by a nut 81, and a plate 82 is supported by a nut 83 and the nut 81 at the left end of the piston rod 66. The plate 82 disposed within the chamber 69 contacts a contact point 84 formed on the second cylinder 64 having an insulator 85 when the level of the brake fluid is uncommonly lowered by excessive wearing of the brake shoe 21' of the brake wheel cylinder 21 so that the diaphragm piston 65 is moved in the rightward direction. Consequently, an electric circuit, namely, the plate 82, the contact point 84, a wire 86, a warning lamp 39, the source of electricity 41 and ground 43, is completed and the warning lamp 39 is lighted.

Numeral 87 and 88 are supporting means for supporting the diaphragm piston 65 and the diaphragm 71, respectively. A bleeder 90 for releasing air is mounted on the top end of the reservoir 11 and has a passage 91 therein. Numeral 92 is a port formed on the reservoir 11 and is connected to a pressure responsive switch 93 through a conduit 94. The switch 93 is connected to the warning lamp 39. The pressure responsive switch 93 operates when the fluid pressure system from the reservoir 11 to the brake wheel cylinder 21 is damaged so that the fluid pressure within the chamber 27 falls below a certain pressure. Consequently, the pressure responsive switch 93 is actuated, and the warning lamp 39 is lighted.

Obviously many changes and modifications of the present invention are possible in light of the foregoing teachings. It is to be understood, therefore, that within the scope of the appended claims, the invention may be practiced otherwise than specifically described herein.

What is claimed is:

1. A master cylinder for a hydraulic braking system having a fluid reservoir connected thereto comprising, a cylinder body provided with a bore therein,
   a piston axially slidably mounted in the bore of said cylinder body and operably connected to a brake pedal, to provide a first chamber at one end of said cylinder,
   biasing means disposed within said first chamber for urging said piston to the brake release position,
   a primary and a secondary sealing cup mounted on opposed ends of said piston for providing seals between the bore and the piston, said piston being provided with an annular recess between said sealing cups to form a second chamber,
   a first passage for fluid communication between the reservoir and said second chamber and a second passage for fluid communication between said second chamber and said first chamber, said second passage being controlled by said primary sealing cup,
   a third passage formed in said cylinder body for fluid communication between said first chamber, said second chamber and said reservoir, said third passage being closed when said piston is moved to increase the hydraulic pressure in said first chamber against said biasing means,
   a poppet valve for controlling communication between the reservoir and said second chamber, and
   means for closing said poppet valve when said piston is moved to increase pressure in said first chamber and in said second chamber,
   whereby said secondary sealing cup serves to pressurize said first chamber when said primary sealing cup fails.

2. A master cylinder as claimed in claim 1 and further comprising a first warning device responsive to failure of said primary sealing cup.

3. A master cylinder as claimed in claim 2, wherein said first warning device comprises a switch responsive to an increase in pressure of the fluid within said second chamber, and a warning lamp responsive to said pressure responsive switch.

4. A master cylinder as claimed in claim 2 and further comprising a second warning device responsive to the level of the fluid in the reservoir when it falls below a predetermined level.

5. A master cylinder as claimed in claim 4 wherein said second warning device comprises a float movable in response to the vertical movement of the fluid surface within the reservoir, a contact switch, said float closing said contact switch when said float is lowered a predetermined amount, and a warning lamp responsive to said contact switch.

6. A master cylinder as claimed in claim 2 and further comprising a third warning device responsive to decreased fluid pressure within the reservoir below a predetermined value due to failure of fluid pressure at a brake cylinder.

7. A master cylinder as claimed in claim 6, wherein said third warning device comprises a diaphragm piston operable when the fluid within the reservoir is decreased, a plate connected to said diaphragm piston, a contact switch, said plate closing said contact switch when said plate is moved with said diaphragm piston, and a warning lamp responsive to said contact switch.

* * * * *